United States Patent [19]

Kurtzbein

[11] 4,001,596
[45] Jan. 4, 1977

[54] WAVE AND CURRENT OPERATED POWER GENERATING DEVICE

[76] Inventor: Earl D. Kurtzbein, 711 W. 46th St., Vancouver, Wash. 98663

[22] Filed: Oct. 3, 1974

[21] Appl. No.: 511,772

[52] U.S. Cl. .................................. 290/53; 415/7; 416/85
[51] Int. Cl.$^2$ ........................................ F03B 13/12
[58] Field of Search ............... 290/42, 43, 54, 55, 290/53; 415/2, 7, 122; 416/85

[56] References Cited

UNITED STATES PATENTS

| 3,816 | 11/1844 | Ross | 415/2 |
|---|---|---|---|
| 4,843 | 11/1846 | Rowand | 415/2 |
| 525,130 | 8/1894 | Boyd | 416/85 |
| 560,589 | 5/1896 | Lewis | 417/334 |
| 904,892 | 11/1908 | Pattosien | 290/54 |
| 924,684 | 6/1909 | Martin | 416/85 |
| 1,113,440 | 10/1914 | Hughes | 416/85 |
| 1,125,830 | 1/1915 | Fogle | 415/7 |
| 1,200,963 | 10/1916 | Manicke | 415/7 |
| 1,338,890 | 5/1920 | Wilber | 416/85 |
| 1,396,609 | 11/1921 | Weisenborn | 415/7 |
| 1,811,031 | 6/1931 | Smith et al. | 416/111 |
| 2,258,699 | 10/1941 | Mackenna | 415/122 |
| 2,366,732 | 1/1945 | Kalix | 415/122 |
| 3,442,492 | 5/1969 | Sullivan | 416/85 |

FOREIGN PATENTS OR APPLICATIONS

| 843,553 | 3/1939 | France | 290/53 |
|---|---|---|---|
| 613,334 | 2/1926 | France | 416/85 |
| 480,756 | 1/1916 | France | 416/85 |
| 265,015 | 12/1927 | Italy | 290/54 |

*Primary Examiner*—Robert K. Schaefer
*Assistant Examiner*—John W. Redman
*Attorney, Agent, or Firm*—Oliver D. Olson

[57] ABSTRACT

A pair of hull portions connected in spaced parallel relation support a water wheel and form a passageway therebetween for driving engagement of flowing water against the vanes of the water wheel. The water wheel is made up of a pair of wheel portions having peripheral gear teeth, and these teeth are engageable with gears which drive electric generators. The vanes of the water wheel are adjustable to vary the driving power thereof and have nozzles thereon arranged to discharge water under pressure to provide a boost for the wheel. A brake is provided to control rotation of the water wheel, and an auxiliary engine is provided to drive the water wheel when necessary. The longitudinal hull portions support a gate mechanism at the inlet end of the water passageway to control the flow of water through such passageway and have air chambers to buoyantly support the device. The device has vertically extendable legs for ground support.

3 Claims, 8 Drawing Figures

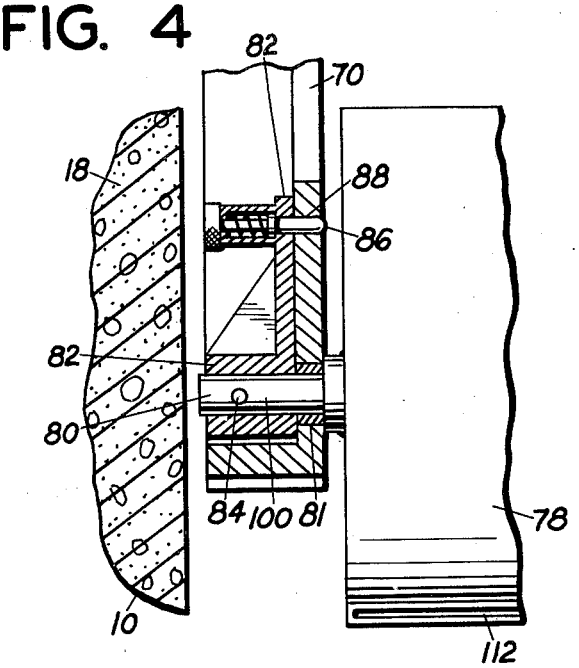
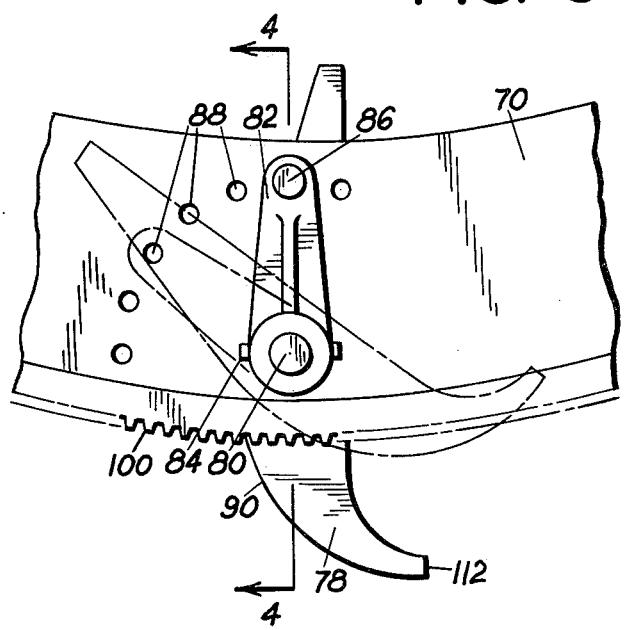
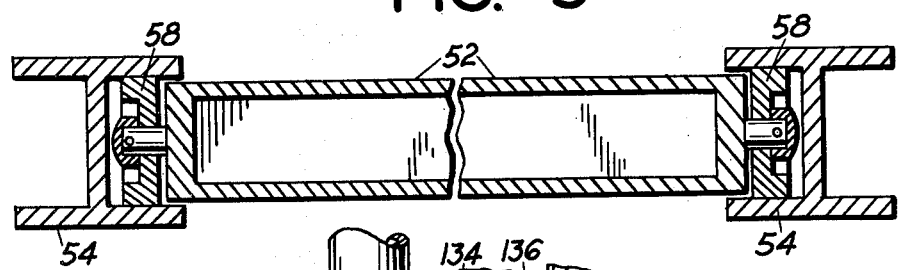
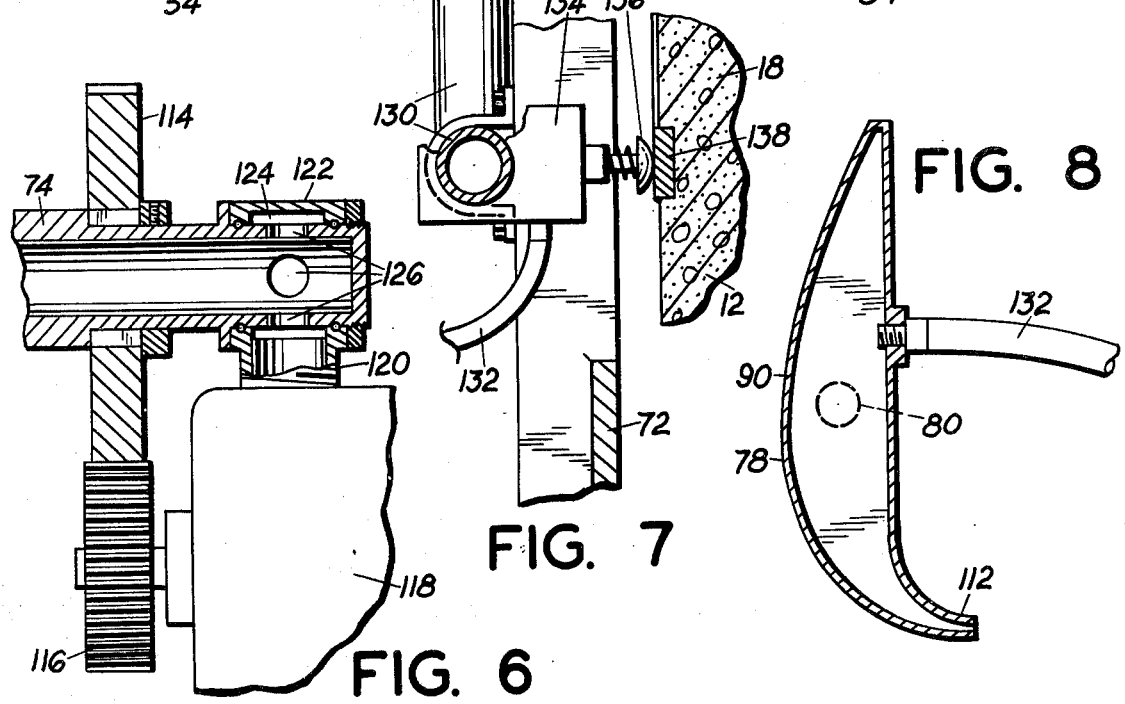

WAVE AND CURRENT OPERATED POWER GENERATING DEVICE

BACKGROUND OF THE INVENTION

This invention relates to new and useful improvements in wave and current power generating devices.

Wave or current operated devices have heretofore been employed for utilizing the natural powers of river flow, tides, wave undulations, and the like. One of such devices is illustrated for example in U.S. Pat. No. 1,289,533 and another for example in U.S. Pat. No. 1,111,161. While these devices are adapted to be driven by such natural forces, they are not sufficiently versatile to warrant commercial use. That is, these prior art devices do not possess a combination of features warranting their acceptance, such as ease of transportation to the working site, efficient usage of available water current, adjustment of the drive output thereof to satisfy necessary requirements, a capability of providing functioning and non-functioning operation of the water wheel, a regulation of the water wheel to a uniform rotative speed, and other important features.

SUMMARY OF THE INVENTION

According to the present invention and forming a primary objective thereof, a wave and current power generating device is provided which overcomes the above enumerated disadvantages of the prior art and more particularly includes a combination of structure making it practical for its intended use.

Objects of the present invention are thus to provide a wave and current power generating device employing a pair of parallel longitudinal hull portions having air chambers which can make the device buoyant for easy transport to the working site and forming a water passageway therebetween for driving a water wheel supported on the hull portions, the device also having vertically extendable leg means capable of supporting it at the proper level at the working site; to provide gate means at the inlet end of the water passageway to control the flow of water therethrough; to provide vane means on the water wheel that are adjustable to vary the driving power and speed of the wheel; to provide water discharge nozzles on projecting portions of the vane means to provide boosting power for rotation of the water wheel; to provide a novel drive connection between the water wheel and generators comprising peripheral gear teeth on the water wheel engageable with gears on the shafts of the generators; to provide brake means for the device to regulate the speed of the wheel or stop it; and to provide an auxiliary power plant on the device to operate the wheel independently of water flow if necessary.

The invention will be better understood and additional objects and advantages will become apparent from the following description taken in connection with the accompanying drawings which illustrate a preferred form of the device.

BRIEF DESCRIPTION OF THE DRAWINGS

FIG. 3 is an enlarged fragmentary elevational view of a portion of a water wheel forming a part of the present device;

FIG. 4 is a fragmentary sectional view taken on the line 4—4 of FIG. 3;

FIG. 5 is an enlarged sectional view taken on the line 5—5 of FIG. 2;

FIG. 6 is an enlarged fragmentary sectional view taken on the line 6—6 of FIG. 1;

FIG. 7 is an enlarged fragmentary sectional view taken on the line 7—7 of FIG. 2; and FIG. 8 is an enlarged sectional view taken through a vane of the invention.

DETAILED DESCRIPTION OF A PREFERRED EMBODIMENT

Figure 1:
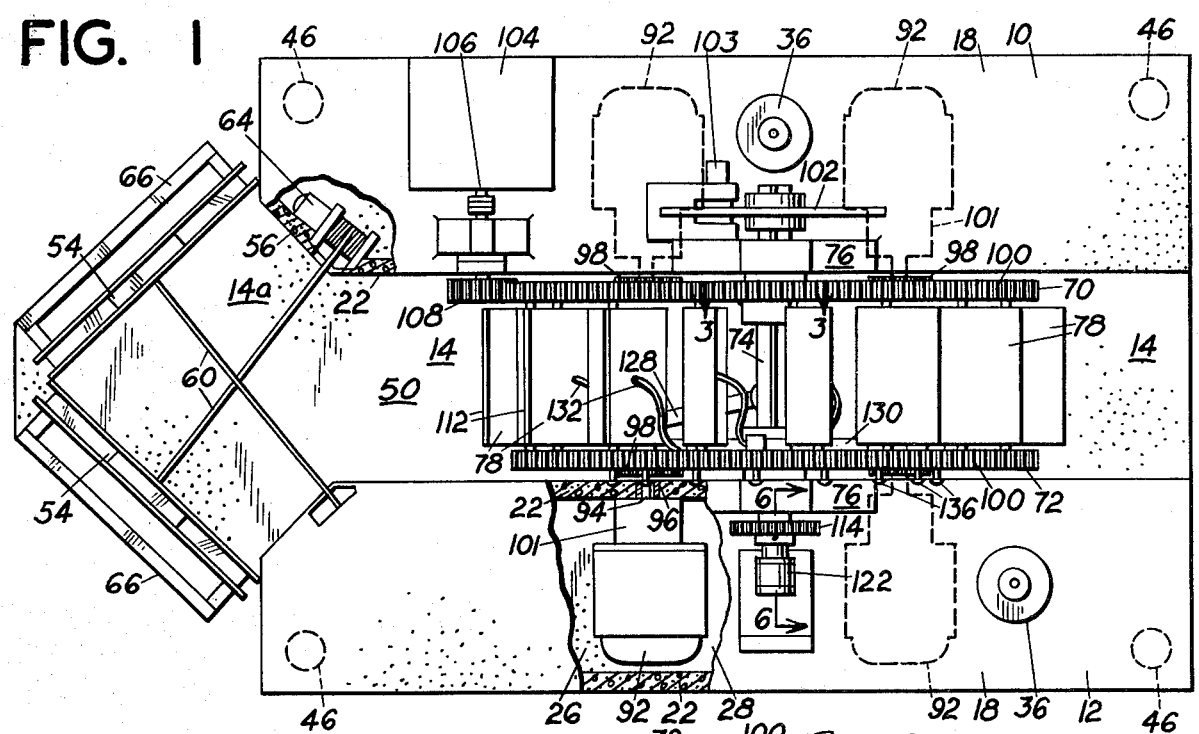
FIG. 1 is a top plan view, partly broken away, of a wave and current power generating device of the present invention.
Figure 2:
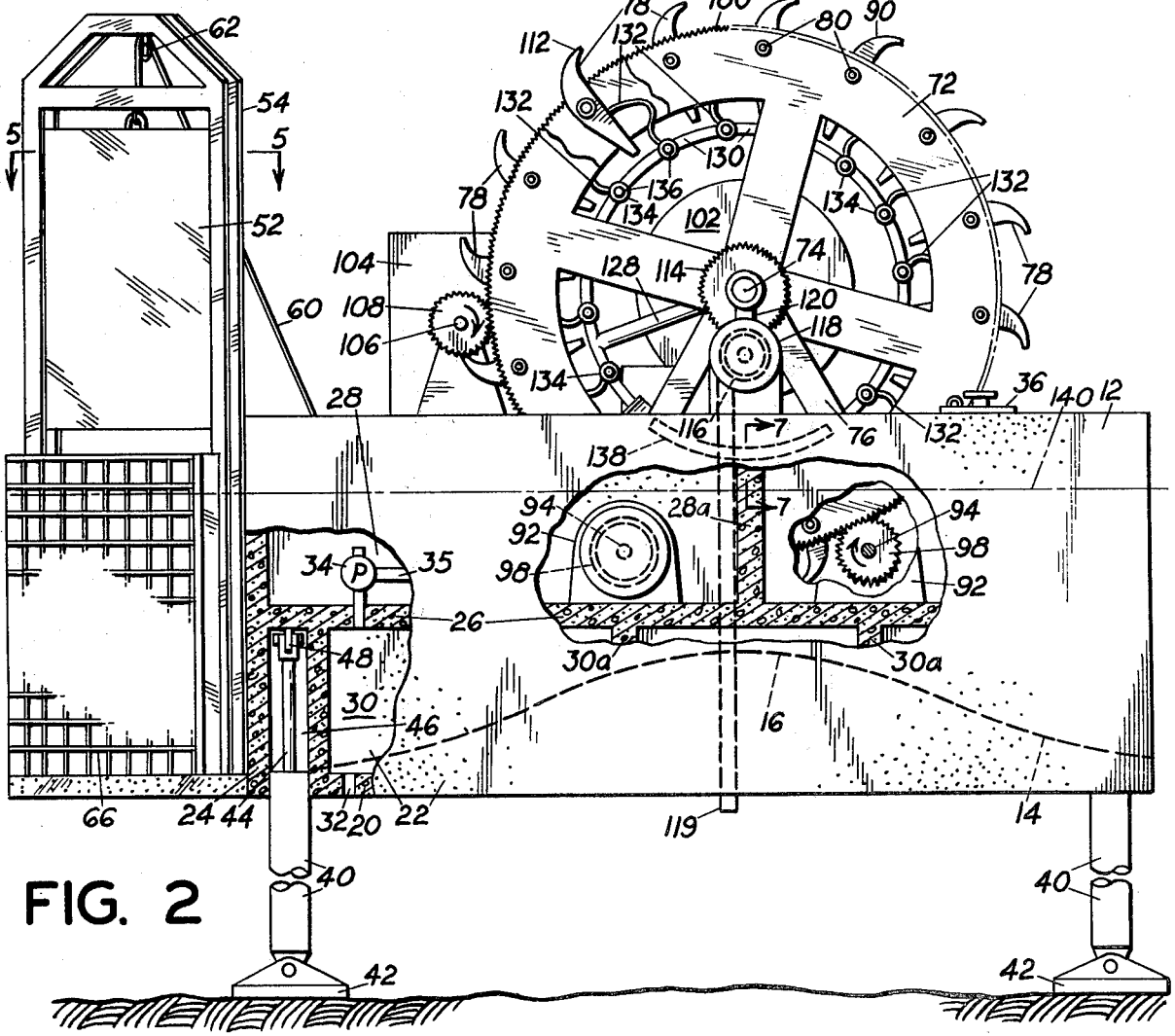
FIG. 2 is a side elevational view, also partly broken away, of the present device.

With particular reference first to FIGS. 1 and 2, the present device includes a pair of longitudinal, parallel hull or frame portions 10 and 12. These frame portions are spaced from each other and are connected by a floor 14 and other suitable means if necessary, not shown, the floor 14 being inclined upwardly from the inlet end to form an arched portion 16 between the ends of the device, the inlet end being at the left-hand side as viewed in FIGS. 1 and 2. Each of the hull portions 10 and 12 is fully enclosed, having a top wall 18, a bottom wall 20, side walls 22, and end walls 24.

Each of the longitudinal hull portions 10 and 12 has an intermediate horizontal wall 26 that divides the interior thereof into upper and lower compartments 28 and 30, respectively, the lower compartments having holes 32 in the bottom wall 20 through which water may flow into and out of such compartments, and a pump-compressor unit 34 is disposed in one of the chambers 28 and has communication with all the chambers 30 by suitable conduit 35 for admitting air into the latter chambers for a reason to be described hereinafter. Upper chambers 28 have suitable hatches 36 for access by personnel. Compartments 28 and 30 may be reinforced by suitable bulkheads 28a and 30a, respectively, the bulkheads 30a having suitable openings, not shown, to provide free flow of water and air therebetween.

Corner leg assemblies are provided for supporting the device on a river or ocean bottom, and each leg assembly comprises a fluid operated cylinder 40 pivotally connected to an enlarged foot member 42 and having its piston rod 44 projecting upwardly into a recess 46 formed in the hull portion and secured pivotally to lug means 48 at the top of the recess. By means of the leg assemblies, the device can be supported on a river or ocean bottom and can be raised and lowered as desired by the fluid operated cylinders to pick up the best water flow according to the height of the river or tide.

The space between the two hull portions 10 and 12 and above the floor 14 forms a water passageway 50, and the water flow into such passageway is controlled by a pair of gates 52 supported in forward peaked relation for vertical movement in a pair of upright frames 54 secured to the forward ends of the hull portions 10 and 12 and also to an extended portion 14a of the floor 14. The front ends of the hull portions 10 and 12 have angled portions 56 to widen the intake area for the passageway, the floor extension 14a flaring out in the area of such angled portions and also extending fully to a point under the gates 52.

With reference to FIG. 5, the upright gate holding frames 54 are H-shaped in cross section, and gates 52 have end rollers 58 mounted thereon for guided movement up and down in track portions formed by the H-shaped frames. Each of the gates has a lifting line 60 secured to the top thereof that passes over a pulley 62 at the top of its respective frame and connected at its lower end to a power winch 64 disposed in the upper compartment 28 of its respective hull portion 10 or 12. By suitable operation of the winches 64 which may be powered by suitable means such as storage batteries, the gates 52 can be opened and closed or moved to an intermediate portion as desired. A protective grating 66 is secured to the front of the frames 54 to prevent large debris from going through the water pssageway 50.

The water wheel portion of the device comprises a pair of wheel portions 70 and 72 disposed in spaced relation and keyed on a cross shaft 74 supported in journaled relation on leg supports 76 on the frame portions.

A plurality of vanes or elevators 78 are supported between the two wheel portions 70 and 72, the support for such vanes comprising individual laterally extending stub shafts 80, FIGS. 3 and 4, on each end of the vanes and projecting through apertures 81 in the wheel portions. The projecting ends of the stub shafts 80 on at least one of the wheel portions have an arm 82 secured thereto, such as by set screws 84, and such arms carry spring pressed latch pins 86 projecting through the arms and arranged to engage any one of a series of holes 88 in the wheel portions 70 or 72. The bottom ends of the vanes 78 project beyond the outer edge of the wheel portion 70 and 72, and such amount of projection to vary the driving power of the vanes is accomplished by the selected engagement of pins 86 in apertures 88. Two positions of adjustment are shown in full and phantom lines in FIG. 3. The back or downstream side of the vanes 78 is rounded at 90 to reduce the drag of the vanes through the water.

Electric generators 92 are supported in the upper compartment 28 and have shaft portions 94 projecting through apertures 96 in inner wall portions 22 of the hulls 10 and 12. The shafts 94 have gears 98 secured thereon, and the wheel portions 70 and 72 have peripheral gear teeth 100 meshing with gears 98. The generators are thus driven by the water powered rotation of the water wheel. Although more or fewer generators may be used, the arrangement of the water wheel and the support means for the generators is convenient for the use of four of such generators, namely, a pair of generators being disposed for engagement with each wheel portion. The generators have suitable controls 101 for cutting them in or out as well understood in the art.

To control the rotative speed of the water wheel, it is preferred that the present device have brake means for the wheel, and for this purpose, one end of shaft 74 projects beyond its support leg 87 and has a disc 102 keyed thereto. The disc 102 is associated with friction clamping means 103 of well known structure. It is also desired that the present device have means for operating the wheel independent of water flow, and for this purpose an engine 104, such as a gasoline engine, is carried on one of the hulls and the output shaft 106 thereof has a pinion gear 108 keyed thereto. Pinion gear 108 has meshing engagement with teeth 100 of one of the wheel portions 70 or 72, and it is apparent that by suitable operation of the engine 104, the water wheel can be rotated to start it, to maintain service if there is no water flow, and for any other reason.

The vanes 78 have jet boosting means, and such boosting means is in the form of nozzles 112, FIG. 8, formed on the end of the vanes that projects into the water. For this purpose, the vanes 78 comprise a hollow body structure communicating with the nozzles and pressured water to the interior of the vanes is furnished by the following structure.

Shaft 74 is hollow, FIG. 6, and the end thereof opposite from the brake means 102, 103 extends beyond its wheel portion 72 and has a gear 114, also seen in FIG. 1 keyed thereto. Gear 114 is in meshing relation with a gear 116 on the shaft of a pump 118 supported on a hull 12 and having a vertical inlet pipe 119 extending down through the hull to a point below the water level. The outlet 120 of pump 118 has communication with the interior of shaft 74 through the medium of a circular bushing 122 having an interior peripheral groove 124 in communication with a plurality of radial apertures 126 in the shaft.

Leading from the shaft 74 between the wheel portions, FIGS. 1 and 2, is a conduit 128 connected into a circular endless manifold 130 secured to the wheel portion 72, the conduit 128 establishing communication between the interior of shaft 74 and the manifold. Manifold 130 has communication with the interior of the vanes 78 by flexible conduits 132 one for each vane, and the communication of fluid flow between such manifold and the vanes is controlled by individual valves 134 mounted on the manifold.

Upon rotation of the water wheel, the pump 118 will be driven and a fluid under pressure will be ejected from the nozzles 112 to boost the power drive of the water wheel. It is preferred that the nozzles be operative only when they are disposed in a lower position, and for this purpose, the valves 134 normally are closed but have a spring pressed plunger 136. FIG. 7, which upon being depressed opens the valves and allows flow of water from the manifold 130 to the flexible conduit 132. To provide operation of the nozzles at their lower point of travel only, the hull portion 12 is provided with a track 138, FIGS. 2 and 7, assuming a selected arcuate contour for engagement of the plungers 136 as they rotate with the wheel. The arrangement is such that when the plungers 136 come in contact with the track 138 they are depressed and the jets are allowed to operate. With particular reference to FIG. 2, it will be seen that the valve mechanisms 134 are disposed a short distance ahead of the vanes with relation to the direction of travel of the wheel, and by means of this structure, the nozzle will be in full operation when it reaches the water level. The nozzle is shut off at about the time that it emerges from the water.

Since the nozzles are shut off in their upper portion of travel, pressure is allowed to build up in the system so that water is ejected from the nozzles at an elevated pressure.

The device may have running light and propelling means, not shown, as required to move it to the operating site.

In setting up the present power generating device, it can be made buoyant and floated to the working site by pumping the water out of chambers 30 through apertures 32 to fill the latter chambers with air. Such is accomplished by activation of the pump-compressor unit 34. In moving the device, the leg assemblies may be retracted, and the gates 52 are opened or closed as desired. Upon reaching the working site, and assuming that the device is to be supported on its leg assemblies, the latter are retracted for suitable engagement of the river or ocean bottom, the air first being let out through the pump-compressor unit to allow water to flow into chambers 30 and allow the device to sink to a point of support on the legs. Leveling is readily accomplished by individual operation of the leg assemblies and of course the desired height according to the level of water, can be maintained. A water level of about the height indicated by the phantom line 140 is preferably maintained. With the gates 52 raised, the current of water flowing through the passageway will operate the wheel which in turn will drive the generators for the intended purpose. The power and rpm of the wheel is controlled by the brake 102, 103, by suitable vertical positioning of gates 52, by vertical positioning of the device on the legs, and by adjustment of the vanes 78. The arch 16 in the flow increases the driving effectiveness of the water against the vanes 78 and most efficiently utilizes the power available from the moving water.

Gates 52 can be completely lowered if it is desired to shut down the water wheel, such as for repair or the like. At those times when driving power is desired and water flow is not available, such as during change of tide and the like, engine 104 may be utilized to drive the water wheel.

It is to be understood that the form of my invention herein shown and described is to be taken as a preferred example of the same and that various changes in the shape, size and arrangement of parts may be resorted to without departing from the spirit of my invention or the scope of my subjoined claims.

Having thus described my invention, I claim:

1. A wave and current power generating device, comprising:
   a. a pair of elongated hollow hulls connected together in laterally spaced, parallel relation, said hulls including compartments arranged to be filled with air to float the hulls and to be filled with water to submerge the hulls,
   b. pump means on one of the hulls communicating with the hull compartments for filling the latter selectively with air and with water,
   c. a floor extending between said hulls below the top thereof forming an open top water passageway therebetween having inlet and outlet ends,
   d. a water wheel cupported for rotation on said hulls with a portion of the water wheel projecting into said water passageway between said inlet and outlet ends, said water wheel comprising
      1. a pair of upstanding circular wheel members spaced apart laterally and extending into said water passageway adjacent the inner sides of the hulls, and
      2. vanes extending transversely between said wheel members for rotating the latter under the influence of water moving through said passageway,
   outwardly projecting gear teeth on the outer periphery of at least one of said circular wheel members,
   f. electric generator means mounted on the hull adjacent said peripheral gear teeth,
   g. gear means on said generator means meshing with the gear teeth on the periphery of said circular wheel member, and
   h. a plurality of vertically extensible legs on the hulls extending adjustably below the latter for support on a submerged surface, for adjusting the depth of the floor of the water passageway between the hulls relative to the water level.

2. The wave and current power generating device of claim 1 including auxiliary power means having a rotary output shaft and a source of operating energy independent of the generator means, and gear means on said rotary shaft meshing with the gear teeth on the periphery of said circular wheel member for providing auxiliary drive power for the water wheel and said generator means.

3. The wave and current power generating device of claim 1 wherein both of said wheel members have outwardly projecting gear teeth on their periphery, and said generator means includes at least one electric generator on each hull adjacent each wheel member and each provided with gear means meshing with the gear teeth on the associated circular wheel member.

* * * * *